United States Patent

Shepodd

[11] Patent Number: 5,998,325
[45] Date of Patent: Dec. 7, 1999

[54] COMPOSITION AND METHOD FOR POLYMER MODERATED CATALYTIC WATER FORMATION

[75] Inventor: Timothy Jon Shepodd, Livermore, Calif.

[73] Assignee: Sandia Corporation, Livermore, Calif.

[21] Appl. No.: 08/939,786

[22] Filed: Sep. 29, 1997

Related U.S. Application Data

[63] Continuation-in-part of application No. 08/789,367, Jan. 24, 1997, abandoned.

[51] Int. Cl.⁶ .............. B01J 31/00; H01J 7/18; H01M 4/88; C01B 3/00
[52] U.S. Cl. ............ 502/151; 502/159; 252/181.1; 252/182.1; 423/248; 422/170
[58] Field of Search ............ 502/159, 154, 502/151; 252/182.12, 182.1, 182.2; 423/248; 422/170; 524/435

[56] References Cited

U.S. PATENT DOCUMENTS

| | | | |
|---|---|---|---|
| 3,896,042 | 7/1975 | Anderson et al. | 252/184 |
| 3,939,006 | 2/1976 | Kozawa | 429/57 |
| 3,963,826 | 6/1976 | Anderson et al. | 423/248 |
| 4,127,134 | 11/1978 | Ushakoff | 128/419 P |
| 4,405,487 | 9/1983 | Harrah et al. | 252/194 |
| 4,512,721 | 4/1985 | Ayres et al. | 417/51 |
| 4,567,033 | 1/1986 | Kesten | 423/648 |
| 4,874,667 | 10/1989 | Lee et al. | 428/402.22 |
| 4,886,048 | 12/1989 | Labaton et al. | 165/104.27 |
| 5,349,507 | 9/1994 | Parker | 362/158 |
| 5,535,107 | 7/1996 | Prok | 362/158 |
| 5,543,121 | 8/1996 | Boffito et al. | 423/210 |
| 5,624,598 | 4/1997 | Shepodd et al. | 252/182.12 |
| 5,624,997 | 4/1997 | Liles et al. | 524/785 |
| 5,723,659 | 3/1998 | White | 562/485 |
| 5,723,707 | 3/1998 | Heyse et al. | 585/444 |
| 5,732,463 | 3/1998 | Breault et al. | 29/825 |
| 5,836,524 | 10/1996 | Wang | 241/23 |

FOREIGN PATENT DOCUMENTS

| | | | |
|---|---|---|---|
| 58-043237 | 3/1983 | Japan | B01J 25/02 |
| 6298844 | 10/1994 | Japan . | |

OTHER PUBLICATIONS

Mayer, Andrea and James Mark. Macromolecular Reports, vol. A33 (7 & 8), pp. 451–459 (1996) "Polymer–Protected Palladium Nanoparticles and Their Use in Catalysis".

*Primary Examiner*—Gary P. Straub
*Assistant Examiner*—Melanie C. Wong
*Attorney, Agent, or Firm*—Timothy Evans; Kurt Olsen

[57] ABSTRACT

A composition suitable for safely removing hydrogen from gaseous mixtures containing hydrogen and oxygen, particularly those mixtures wherein the hydrogen concentration is within the explosive range. The composition comprises a hydrogenation catalyst, preferably Pd dispersed on carbon, wherein the concentration of Pd is from about 1–10 wt %, dispersed in a polymeric material matrix. As well as serving as a matrix to contain the hydrogenation catalyst, the polymeric material, which is substantially unreactive to hydrogen, provides both a diffusion restriction to hydrogen and oxygen, thereby limiting the rate at which the reactants (hydrogen and oxygen) can diffuse to the catalyst surface and thus, the production of heat from the recombination reaction and as a heat sink.

8 Claims, 1 Drawing Sheet

COMPOSITION AND METHOD FOR POLYMER MODERATED CATALYTIC WATER FORMATION

This application is a continuation-in part of application Ser. No. 08/789,367, filed Jan. 24, 1997, for POLYMER MODERATED WATER FORMATION, now abandoned.

STATEMENT OF GOVERNMENT INTEREST

This invention was made with Government support under contract no. DE-AC04-94AL85000 awarded by the U.S. Department of Energy to Sandia Corporation. The Government has certain rights in the invention.

BACKGROUND OF THE INVENTION

This invention pertains generally to a composition of matter suitable for removing hydrogen from gaseous mixtures including hydrogen and oxygen and particularly to a composition suitable for removing hydrogen from gaseous mixtures containing hydrogen and oxygen, wherein the concentration of hydrogen is within the explosive range.

Hydrogen can be produced from corrosion of metals by atmospheric gases or stray electric currents; from batteries, operating in normal or abnormal condition; and from leaky hydrogen piping. The accumulation of hydrogen can present a significant fire hazard and in the presence of oxygen can represent a potential explosion hazard particularly in sealed components.

It has long been known that hydrogen absorbing materials, known as getters, can be used to counteract hydrogen accumulation. Ayers et al. discuss the use of active metals such as zirconium or titanium, and alloys thereof in U.S. Pat. No. 4,512,721. These metals are capable of maintaining low hydrogen partial pressures but have the disadvantage of requiring high temperatures for initial activation and/or ongoing operation because of the necessity to diffuse surface contaminants into the bulk metal thereby providing a fresh surface for continued hydrogen absorption. Furthermore, in the presence of oxygen the hydrogen/oxygen mixture can react explosively on contact with these getter materials.

Labaton, in U.S. Pat. No. 4,886,048, describes another means for removing hydrogen by reacting the hydrogen with oxygen to form water, in the presence of a noble metal catalyst such as palladium, and trapping the water on a water absorbing material such as a molecular sieve. However, hydrogen getters of this type are expensive, bulky, and capable of causing a detonation if the concentrations of hydrogen and oxygen are within the explosive range, generally defined as mixtures of hydrogen and oxygen, wherein the hydrogen concentration is greater than about 6 vol % and less than about 67 vol %.

Conventional hydrogen getters, such as those described in the above-referenced patents are expensive, can require special operating conditions such as high temperature regimes or ancillary reactants in order to maintain low hydrogen partial pressures, generally will not work well or at all in the presence of water, may require the presence of oxygen, be poisoned by oxygen, and may pose significant safety hazards, including fire and explosion if handled improperly, for example by exposure to air.

It is well known in the art that unsaturated carbon-carbon bonds (i.e., double or triple bonds between carbon atoms) can be reduced by hydrogen and its isotopes in the presence of an appropriate catalyst to form an alkane. Anderson et al. in U.S. Pat. Nos. 3,896,042 and 3,963,826 and Harrah et al. in U.S. Pat. No. 4,405,487 disclose the use of solid acetylenic compounds (i.e., organic compounds having carbon-carbon triple bonds) combined with various Group VIII metal catalysts to irreversibly remove hydrogen over the temperature range $-50°$ C. to $110°$ C. Shepodd et al. in co-pending application Ser. Nos. 08/424,775, 08/647,093, and 08/716,752 disclose other compositions of unsaturated organic compounds and noble metal catalysts, preferably Pd, suitable for gettering hydrogen under a variety of conditions. However, the aforementioned hydrogen getter compositions suffer from the drawback that the addition of hydrogen to unsaturated bonds can cause significant changes in physical properties of the organic compound, such as melting point, which may be undesirable The generation and accumulation of hydrogen is a concern in sealed electronic devices where hydrogen accumulation could become a safety hazard. One particular concern is found in portable lighting devices such as lanterns and flashlights which employ batteries having aqueous electrolytes and which must provide means for safely eliminating hydrogen evolved as the result of corrosion reactions, charging, inadvertent battery reversal, etc. As taught in U.S. Pat. Nos. 5,349,507, and 5,535,107 various solutions comprising the use of venting means which may or may not be coupled with a catalyst pellet to effect catalytic recombination of hydrogen and oxygen to form water have been proposed to remove hydrogen overpressure from these systems.

Of particular concern, however, is the presence of both hydrogen and oxygen because of the potential for an explosion in the case of a static electric discharge or a spark as well as in the presence of a noble metal hydrogenation catalyst. It will be appreciated by those skilled in the art, that the reaction between hydrogen and oxygen in the presence of a hydrogenation catalyst is rapid and exothermic and over a wide range of concentrations can be explosive because the catalyst temperature can rise from the heat of reaction above the ignition temperature of the mixture of hydrogen and oxygen gases. What is desired is a means for safely removing hydrogen from an atmosphere which contains oxygen without the danger of explosion. The present invention, by mediating the reaction between hydrogen and oxygen, in the presence of a hydrogenation catalyst, to form water, provides a means for removing hydrogen from atmospheres including a mixture of hydrogen and oxygen particularly at concentrations of hydrogen within the explosive range.

SUMMARY OF THE INVENTION

The present invention provides a composition of matter suitable for safely removing hydrogen from gas mixtures including hydrogen and oxygen, particularly when the concentration of hydrogen is within the explosive range, by the controlled reaction between hydrogen and oxygen, in the presence of a catalyst, to form water.

What the inventor has discovered is that by dispersing a noble metal hydrogenation catalyst, preferably Pd dispersed on an inert medium such as carbon, in a polymeric matrix that is substantially unreactive to hydrogen, it is possible to moderate the potentially explosive reaction between hydrogen and oxygen, in the presence of the noble metal catalyst, such that the hydrogen can be safely removed. It is believed that the polymeric matrix serves two functions: 1) as a permeation restriction to the reactive hydrogen and oxygen gases, slowing the rate of diffusion of these gases to the hydrogenation catalyst, thereby reducing the consequent production of heat; and 2) as a heat sink to immediately absorb the heat of reaction between hydrogen and oxygen and conduct it away from the catalyst in order that the temperature cannot rise to the ignition temperature of the mixture of hydrogen and oxygen.

By dispersing a noble metal hydrogenation catalyst in a polymeric matrix, the present invention further provides a means for employing the catalyst in a variety of useful forms such as a monolith, a potting agent, and a thermally or UV curable coating or paint that can be applied directly to devices where hydrogen might be generated.

DETAILED DESCRIPTION OF THE INVENTION

Figure 1:
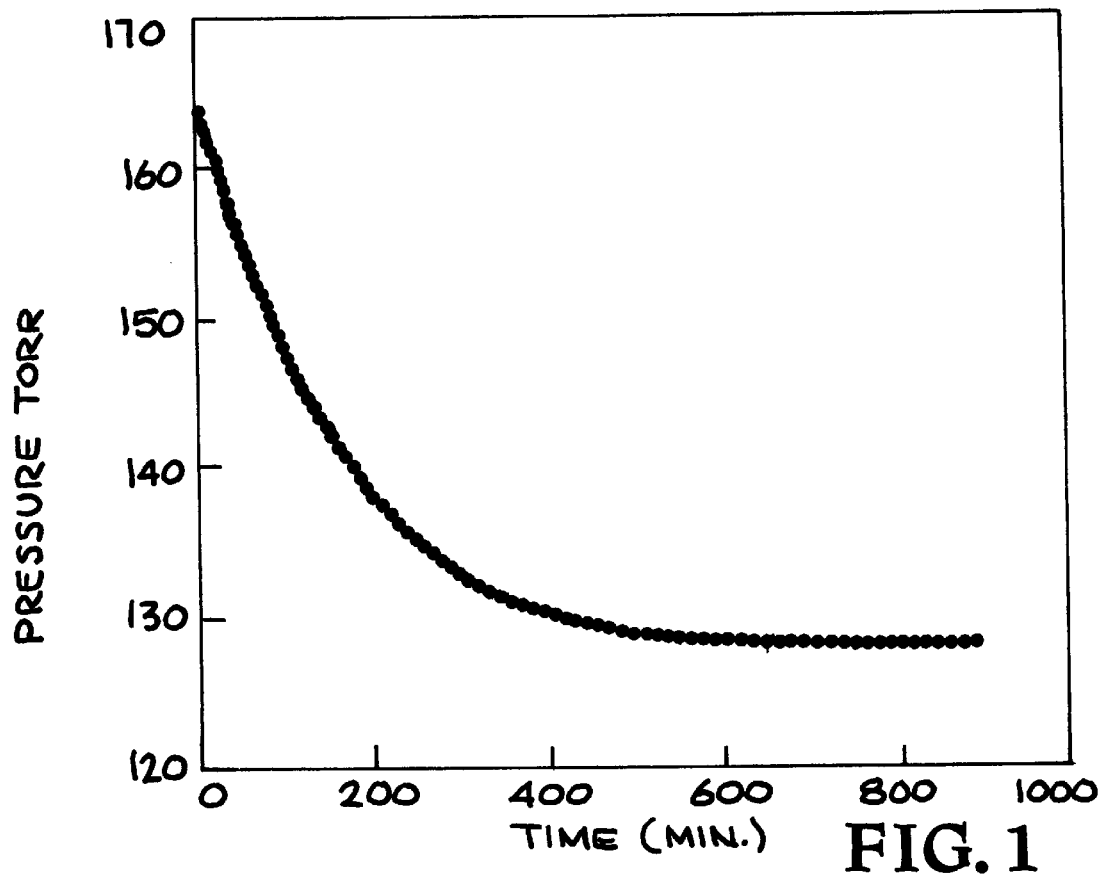
FIG. 1 shows a typical pressure/time curve.

The present invention provides a method for safely removing hydrogen from hydrogen/oxygen mixtures that can be explosive by recombining the hydrogen and oxygen in the presence of a noble metal hydrogenation catalyst, dispersed in a polymeric matrix, to form water. In the invention disclosed herein, a noble metal hydrogenation catalyst is dispersed in a polymeric matrix that is substantially unreactive to hydrogen and that provides for the diffusion of hydrogen and oxygen to the catalyst but prevents a run-away exothermic reaction between hydrogen and oxygen (i.e., an explosion) by limiting the rate at which the reactants (hydrogen and oxygen) can diffuse to the catalyst surface and thus, the rate of the exothermic hydrogen/oxygen recombination reaction and the rate at which heat is generated. The polymeric matrix further provides a heat sink that removes the heat generated by the exothermic hydrogen/oxygen recombination reaction, thus helping to moderate the rate of reaction between hydrogen and oxygen. The present invention provides additional benefit for a closed system containing a high concentration of hydrogen and no oxygen that is suddenly exposed to oxygen (air). The invention will not serve as an ignition source in such a scenario because of the moderated reaction rate, as discussed above.

In contrast to prior art polymer getter materials such as those described in U.S. Pat. Nos. 3,896,042, 3,963,826 and 4,405,487 and co-pending application Ser. Nos. 08/424,775 and 08/716,752, the polymeric material of the present invention does not participate as a reactant but only serves as a matrix to contain the hydrogenation catalyst, as a diffusion restriction, and as a heat sink. This is advantageous in that there are essentially no changes in the physical properties of the polymeric matrix material because of hydrogenation.

A composition suitable for removing hydrogen from a hydrogen/oxygen mixture, wherein the concentrations of hydrogen and oxygen can be within the explosive range, can be prepared by adding between about 1–95 wt %, preferably between 1–30 wt %, of a hydrogenation catalyst, preferably between 1–10 wt % Pd dispersed on an inert medium, such as carbon or alumina, to a polymeric matrix material selected from the group consisting of silicone-based catalyst dispersions, including 2-part catalyzed addition cure, such as by Pt compounds and other metal-based compounds; 1-part moisture cure, such as commonly release acetic acid, methanol, or oxime; water-based acrylic paint dispersions; water-based zinc chromate primer dispersions; a pigment and resin in a vehicle such as water or an organic solvent (ink); and solvent and solventless suspensions of coatings cured by oxygen, heat or UV radiation and combinations thereof. The composition can be prepared as a monolith, a thermally or UV curable coating or paint, an adhesive, or a potting agent or in many other forms which will be obvious to those skilled in the art.

It should be noted that chemicals that can interact with the catalyst can inhibit the reaction hydrogen/oxygen recombination reaction. Carbon monoxide, amines, ammonia, sulfur containing moieties, and oximes for example will slow the reaction.

In order to better understand and appreciate its nature and scope the present invention now will be described more fully hereinafter by way of various examples illustrative of the invention. This invention may, however, be embodied in many different forms and should not be construed as limited to the embodiments set forth herein but as defined by the appended claims.

EXAMPLE 10 g of a 1 wt % Pd on C catalyst was dispersed into 90 g of an acetoxy-type silicone sealant (1-part moisture cure) by mixing. Hand mixing will yield working formulations, but mechanical mixing is preferred to fully disperse the catalyst. Different mechanical mixers such as blenders, attritors, or kneaders are effective depending on the viscosity of the starting and finished materials. Additional organic solvents or water may be added as processing aids. To be effective the polymeric matrix material and hydrogenation catalyst should be mixed together until essentially no free powder remains. The formulation may be cured and used as a monolith or coated onto a substrate for subsequent curing (thermal cure, moisture cure, UV cure, etc.). Here, the mixture was spread on a plate to form an even layer and allowed to cure. A 106 mg portion of cured mixture was placed in a reactor containing 5.37 std cc of laboratory air at 20° C. Hydrogen gas (6.26 std cc) was then added to the reactor to produce a final volume of 9.05 std cc. The pressure/time curve was recorded and is shown as FIG. 1. It can be seen that there is no indication of an explosion, which would be manifest as a rapid increase in pressure; only a gradual decrease in pressure was observed as hydrogen and oxygen reacted together in the presence of the Pd catalyst contained in the polymeric matrix. From the data shown in FIG. 1 it was determined that 10% of the theoretical pressure drop occurred at 100 min.

Table 1 identifies various formulations that were prepared to illustrate this invention. The formulations shown in Table 1 were all prepared by mixing the components together to provide a dispersion of the catalyst in the polymeric matrix material.

TABLE 1

| Formula | Composition |
| --- | --- |
| A | 10 g of 1% Pd/C + 90 g acetoxy-type silicone rubber |
| B | 7.5 g of 1% Pd/C + 42.9 g of a UV curable paint comprising 17.5 g low molecular weight polybutadiene, 17.5 g acrylated low molecular weight polybutadiene, 7.5 g carbon black, and 0.4 g photoinitiator/accelerator. |
| C | 15 g of 1% Pd/C + 90.4 g of a UV curable paint comprising 79.1 g acrylated low molecular weight polybutadiene, 10 g carbon black, and 1.3 g photoinitiator/accelerator. |

TABLE 1-continued

| Formula | Composition |
|---|---|
| D | 4 g of 1% Pd/C + 15 g of a 2-part Pt-catalyzed addition cure silicone rubber. and 1 g carbon black. |
| E | 2.5 g of 1% Pd/C + 15 g of a 2-part Pt-catalyzed addition cure silicone rubber and 7.5 g carbon black. |
| F | 6 g of 1% Pd/C + 14 g of a UV curable paint comprising 10.2 g acrylated low molecular weight polybutadiene, 3.5 g 1,1,1-tri(methacryloxymethyl)ethane, and 0.3 g photoinitiator/accelerator. |
| G | 5 g of 1% Pd/C + 40 g (solids basis) of a pigmented acrylic, water-based paint. |
| H | 5 g of 1% Pd/C + 47.5 g of a UV curable paint comprising 22.8 g acrylated low molecular weight polybutadiene, 18.8 g 1,1,1-tri(methacryloxymethyl)ethane, 2.5 g carbon black, 2.5 g powdered talc, and 0.9 g photoinitiator/accelerator. |
| J | 5 g of 1% Pd/C + 81.7 g of a UV curable paint comprising 22.8 g acrylated low molecular weight polybutadiene, 18.8 g 1,1,1-(methacryloxymethyl)ethane, 36.7 g carbon black, 2.5 g powdered talc, and 0.9 g photoinitiator/accelerator. |
| K | 2.5 g of 1% Pd/C + 21.2 g of a solvent based varnish (Varathane) and 1.3 g carbon black. |
| L | 2.5 g of 1% Pd/C + 21.3 g (solids basis) of a water-based acrylic primer paint containing a rust inhibitor (ZnCrO$_4$) and 1.3 g carbon black. |
| M | 3.75 g of 1% Pd/C + 52.9 g of a 1-part oxime cure silicone rubber. |
| N | 5 g of 1% Pd/C + 7.8 g (solids basis) of a pigmented ink dried on paper. |
| O | 3.6 g or 10% Pd/C and 0.9 g of Pt-catalyzed addition cure silicone rubber were thoroughly mixed and cured at 100° C. for 2 hours. The product was mixed with 5.5 g low molecular weight polybutadiene. |

The ability of the formulations described in TABLE 1 to remove hydrogen safely from hydrogen/oxygen mixtures was tested as set forth in the EXAMPLE above. Pressure/time curves similar to FIG. 1 were generated for each formulation tested. The results of the testing, expressed as the time to 10% of the theoretical pressure drop (TDP), are presented in TABLE 2. It should be noted that in no case was an increase in pressure, indicative of an explosive reaction between hydrogen and oxygen, observed.

TABLE 2

| Formula | Time to 10% TDP (min) |
|---|---|
| A | 100 |
| B | 130 |
| C | 600 |
| D | 10 |
| E | 150 |
| F | 30 |
| G | 80 |
| H | 100 |
| J | 110 |
| K | 1040 |
| L | 10 |
| M | 250 |
| N | 10 |
| O | 4 |

These data show that hydrogen can be safely removed from hydrogen/oxygen mixtures and that the hydrogen/oxygen recombination reaction is strongly influenced both by the matrix material in which the hydrogenation catalyst is dispersed as well as the concentration of Pd/C hydrogenation catalyst dispersed therein, thereby permitting the composition to be tailored to meet any design constraints.

Figure 2:
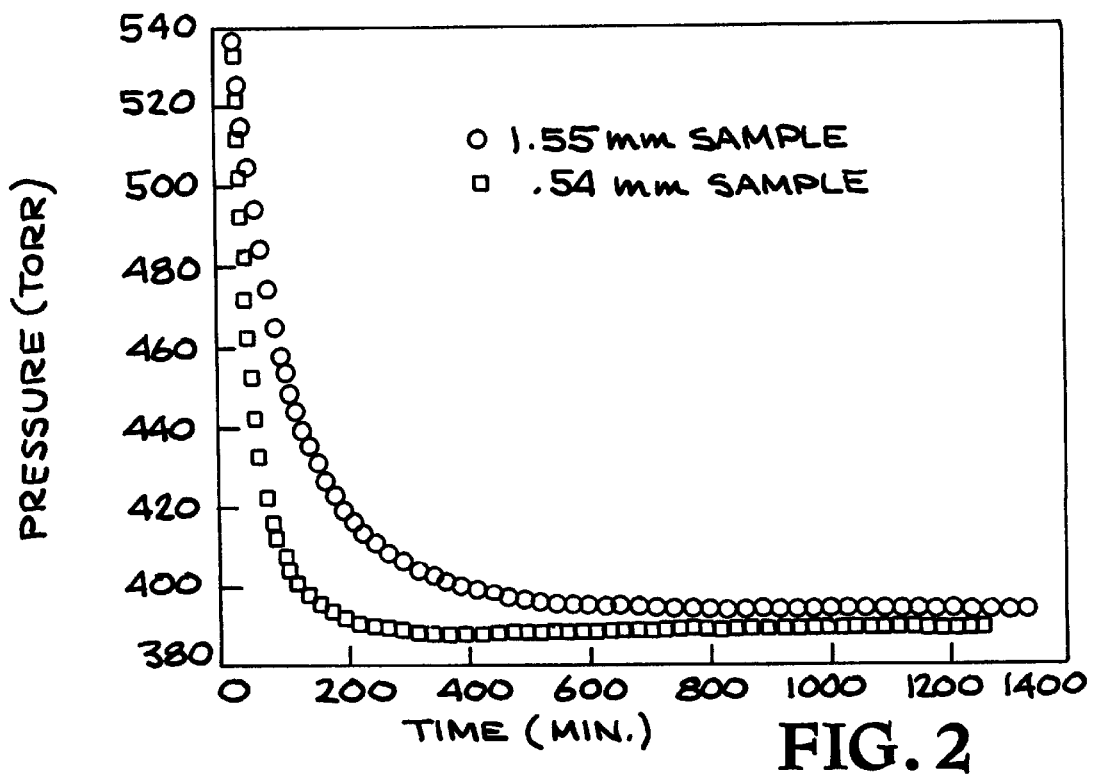
FIG. 2 shows the pressure/time curves for two embodiments of a catalyst/polymer matrix material composition.

Referring now to FIG. 2, wherein the effect of physical configuration of the polymeric matrix material on the rate of hydrogen reaction is shown, it can be seen that a thicker film of equivalent mass of composition D (Table 1) decreases the rate of hydrogen removal from a hydrogen/oxygen mixture. This effect is shown in more detail in Table 3.

TABLE 3

| Thickness (mm) | Time to 10% TDP (min) | Time to 50% TDP (min) | Time to 90% TDP (min) |
|---|---|---|---|
| 0.54 | 10 | 20 | 50 |
| 1.55 | 10 | 40 | 120 |

A composition suitable for removing hydrogen from a hydrogen/oxygen mixture can also be prepared by combining a hydrogenation catalyst with a silicone matrix material, such as a 1-part moisture or 2-part catalyzed addition cure silicone. In order for the hydrogenation catalyst to function properly it is necessary for both the hydrogen and oxygen to reach an active site on the catalyst surface. Thus, it will be appreciated that exposing the hydrogenation catalyst to liquid water is deleterious to its performance because of the low solubility of hydrogen gas in water. This composition is particularly desirable since the silicone matrix material inhibits the ingress of liquid water while simultaneously acting as a high permeation material that allows water vapor to leave the reaction site, driven by the heat of the hydrogen/oxygen recombination reaction.

The hydrogenation catalyst, typically a noble metal dispersed on an inert substrate and preferably 1–10 wt % Pd dispersed on carbon, can be mixed with the silicone matrix material by hand or with the aid of a mechanical mixer. It is preferred that the proportions of hydrogenation catalyst to silicone matrix material be in the weight ratio of about 80:20, however, other proportions have been shown to be useful. The silicone matrix material is then cured using procedures known to those skilled in the rubber art. Subsequent to curing of the silicone matrix material, the siliconized hydrogenation catalyst can be further processed by, for example, wet or dry grinding or milling or other methods known to those skilled in the art, to modify the particle size or produce a more uniform particle size distribution.

The siliconized hydrogenation catalyst can be mechanically mixed with a rubber material selected from the group consisting of styrene/butadiene rubber, silicone-based rubber, styrene/butadiene/acrylonitrile rubber, and polybutadiene rubber. It is desirable that the two materials be intimately mixed. Intimate mixing of the siliconized hydrogenation catalyst and the rubber material can be done by methods known to those skilled in the art such as by grinding or milling. Mixing can be done with the use of a processing aid such as a liquid grinding medium. A preferred liquid grinding medium is liquid nitrogen which renders the materials brittle, thereby effectuating size reduction and intimate mixing, and is easily removed from the resulting rubber/siliconized hydrogenation catalyst mixture by evaporation. The preferred weight ratio of rubber material to siliconized hydrogenation catalyst can be between 10:90 and 75:25. The rubber/siliconized hydrogenation catalyst mixture can be formed into a monolith or dispersed in a liquid medium and the dispersion can then be rolled, brushed or sprayed onto a surface.

Mixing the hydrogenation catalyst with a silicone matrix material also serves to reduce hydrogenation of any unsaturated bonds that can be present in the rubber material; a process incidental to the operation of the compositions claimed herein.

From the foregoing description and examples, one skilled in the art can readily ascertain the essential characteristics of the present invention. The description and examples are intended to be illustrative of the present invention and are not to be construed as limitations or restrictions thereon, the invention being delineated in the following claims.

I claim:

1. A method for making a powdered catalyst mixture comprising the steps of:
   a) mixing a hydrogenation catalyst with an uncured, liquid silicone rubber;
   b) curing said liquid silicone rubber to form a silconized hydrogenation catalyst;
   c) mixing the siliconized hydrogenation catalyst with a second polymer material, selected from the list consisting of styrene/butadiene rubber, styrene/butadiene/acrylonitrile rubber, and polybutadiene rubber, by comminuting said silconized catalyst and said second polymer material together with a liquid grinding aid to form a powdered catalyst mixture; and
   d) separating said powdered catalyst mixture from said grinding aid.

2. The method of claim 1, wherein the hydrogenation catalyst is a noble metal dispersed on an inert substrate.

3. The method of claim 2, wherein the hydrogenation catalyst is palladium on carbon.

4. The method of claim 3, wherein the concentration of palladium is from 1–10 wt % of the weight of the powdered catalyst mixture.

5. The method of claim 1, wherein the hydrogenation catalyst is mixed with the silicone rubber in a weight ratio of about 4 parts hydrogenation catalyst to 1 part silicone rubber.

6. The method of claim 1, wherein the weight ratio of said second polymer to said siliconized hydrogenation catalyst is between about 10 wt % to about 75 wt %.

7. The method of claim 1, further comprising the steps of:
   a) dispersing the mixed catalyst powder in a liquid medium to form a dispersion; and
   b) applying said dispersion to a surface, forming a coated surface.

8. The method of claim 1, wherein said grinding aid is liquid nitrogen.

* * * * *